United States Patent
Whitmyer, Jr.

(10) Patent No.: US 7,647,364 B2
(45) Date of Patent: *Jan. 12, 2010

(54) ONSITE BACKUP OF INTERNET-BASED DATA IN A REQUESTED FORMAT

(75) Inventor: Wesley W. Whitmyer, Jr., Stamford, CT (US)

(73) Assignee: WhitServe LLC, Stamford, CT (US)

( * ) Notice: Subject to any disclaimer, the term of this patent is extended or adjusted under 35 U.S.C. 154(b) by 700 days.

This patent is subject to a terminal disclaimer.

(21) Appl. No.: 11/223,335

(22) Filed: Sep. 9, 2005

(65) Prior Publication Data

US 2006/0010179 A1 Jan. 12, 2006

Related U.S. Application Data

(63) Continuation of application No. 09/706,651, filed on Nov. 6, 2000, now Pat. No. 6,981,007, which is a continuation-in-part of application No. 09/610,709, filed on Jul. 7, 2000, now abandoned.

(60) Provisional application No. 60/143,093, filed on Jul. 9, 1999.

(51) Int. Cl.
  G06F 12/00 (2006.01)
  G06F 17/30 (2006.01)
  H04L 29/06 (2006.01)

(52) U.S. Cl. .................. 707/204; 707/10; 713/161

(58) Field of Classification Search .......... 707/204, 707/1, 10, 104.1; 705/51; 713/165, 194
See application file for complete search history.

(56) References Cited

U.S. PATENT DOCUMENTS

| | | | |
|---|---|---|---|
| 5,410,646 A | 4/1995 | Tondevold et al. | 395/149 |
| 5,634,052 A | 5/1997 | Morris | 395/601 |
| 5,649,196 A * | 7/1997 | Woodhill et al. | 707/204 |
| 5,673,381 A | 9/1997 | Huai et al. | 395/180 |
| 5,696,901 A | 12/1997 | Konrad | 395/200.09 |
| 5,771,354 A | 6/1998 | Crawford | 395/200.59 |
| 5,812,398 A * | 9/1998 | Nielsen | 705/1 |
| 5,903,881 A | 5/1999 | Schrader et al. | 705/42 |
| 5,940,843 A | 8/1999 | Zucknovich et al. | 707/516 |
| 5,940,845 A * | 8/1999 | Prager et al. | 715/210 |
| 5,963,642 A | 10/1999 | Goldstein | |
| 6,003,044 A | 12/1999 | Pongracz et al. | 707/204 |
| 6,032,119 A | 2/2000 | Brown et al. | 705/2 |
| 6,076,167 A | 6/2000 | Borza | 713/201 |
| 6,119,118 A * | 9/2000 | Kain et al. | 707/10 |
| 6,289,347 B1 | 9/2001 | Giroux | 707/10 |
| 6,330,570 B1 | 12/2001 | Crighton | 707/204 |
| 6,360,330 B1 | 3/2002 | Mutalik et al. | 714/4 |
| 6,393,569 B1 | 5/2002 | Orenshteyn | 713/201 |

(Continued)

*Primary Examiner*—Miranda Le
(74) *Attorney, Agent, or Firm*—St. Onge Steward Johnston & Reens LLC

(57) ABSTRACT

A system for onsite backup of internet-based data is provided. The system includes a central computer, a client computer, a communications link between the central computer and the Internet, and a communications link between the client computer and the Internet. The system also includes at least one database containing a plurality of data records accessible by the central computer, each data record containing a client identification number. Software executing on the central computer receives a data backup request, and software executing on the central computer transmits the data backup to the client computer.

14 Claims, 3 Drawing Sheets

U.S. PATENT DOCUMENTS

| | | |
|---|---|---|
| 6,411,943 B1 | 6/2002 | Crawford .................... 705/400 |
| 6,453,325 B1 | 9/2002 | Cabrera et al. ............. 707/204 |
| 6,457,012 B1 | 9/2002 | Jatkowski ................... 707/101 |
| 6,487,561 B1 | 11/2002 | Ofek et al. .................. 707/204 |
| 6,487,644 B1 * | 11/2002 | Huebsch et al. ............. 711/162 |
| 6,493,825 B1 | 12/2002 | Blumenau et al. ........... 713/168 |
| 6,505,216 B1 | 1/2003 | Schutzman et al. ......... 707/204 |
| 6,550,011 B1 * | 4/2003 | Sims, III ..................... 713/193 |
| 6,571,280 B1 | 5/2003 | Hubacher ................... 709/217 |
| 6,574,733 B1 | 6/2003 | Langford .................... 713/194 |
| 6,615,327 B1 * | 9/2003 | Satoyama et al. ........... 711/162 |
| 6,778,668 B1 | 8/2004 | Nielson ...................... 380/201 |
| 6,785,786 B1 * | 8/2004 | Gold et al. .................. 711/162 |
| 6,880,008 B1 | 4/2005 | Yoneda ....................... 709/226 |
| 6,883,110 B1 | 4/2005 | Goodard ......................... 714/6 |
| 6,912,629 B1 * | 6/2005 | West et al. .................. 711/161 |
| 7,069,466 B2 * | 6/2006 | Trimmer et al. ................ 714/6 |
| 2004/0034811 A1 * | 2/2004 | Trimmer et al. ............... 714/13 |
| 2006/0053147 A1 * | 3/2006 | Wahlert et al. .............. 707/102 |

\* cited by examiner

ONSITE BACKUP OF INTERNET-BASED DATA IN A REQUESTED FORMAT

CLAIM OF PRIORITY

This application is a continuation of U.S. patent application Ser. No. 09/706,651 filed Nov. 6, 2000, now U.S. Pat. No. 6,981,007, which is a continuation in part of U.S. patent application Ser. No. 09/610,709 filed Jul. 7, 2000, now abandoned, which claims the benefit of the filing date of U.S. Provisional Patent Application Ser. No. 60/143,093 filed Jul. 9, 1999.

FIELD OF THE INVENTION

The invention relates to outsourced, Internet-based data processing and more particularly to safeguarding customer/client data when a business outsources data processing to third party Internet-based systems.

BACKGROUND OF THE INVENTION

In an effort to improve customer service, companies are increasingly moving their data processing systems onto the Internet and providing web interfaces for their customers to see and manipulate their own data. Examples include my prior U.S. Pat. No. 5,895,468 and related U.S. application Ser. No. 09/237,521. Many other Internet based order entry and payment billing systems also exist.

Also companies are or soon will be outsourcing data processing for their own customers to third parties who, for example, develop and host the companies' web sites. This cuts costs and relieves companies of having to hire software expertise to service their customers and also relieves them of having to maintain hardware for scalability and to prevent service outages which erode customer confidence in the company. Further, hardware can be located in one place to minimize maintenance and bandwidth costs, while software and data entry can be located in one or multiple places where it is least expensive and can offer 24/7 coverage.

One difficulty companies face when considering whether to outsource data-processing to third party, Internet-based systems is the safeguarding of their and their clients' data. This problem is exacerbated when the company has a duty or professional responsibility to safeguard the data, such as a publicly traded company, law firm or medical practice. Another difficulty companies face in considering to outsource is continuity of service if, for example, the third party were to go out of business.

Many companies who currently perform their own data processing and are sensitized to the need to safeguard their and their customers' data have recently connected their LANs to the Internet, and are beginning to use third-party, Internet-based backup services (see FIG. 2). This provides a prudent off-site backup but does not offer the benefits of outsourcing the data processing to the Internet. Internet data backup companies include, inter alia, and Storage Tek.

Internet-based application service providers, so-called "ASPs" are known and provide the advantage that hardware and software maintenance and upgrades are centrally managed by a third party and not by each user or each LAN (see FIG. 3). User data may even be stored on the internet site, however, the data is still entered and manipulated by each user on his LAN/computer and the data manipulation and reporting is handled by each user on his LAN/computer.

What is desired, therefore, is an Internet-based data processing system which safeguards data providing an incentive for companies to outsource their data processing. Safeguarding applications, and especially any user customized settings, would also be desirable.

SUMMARY OF THE INVENTION

It is an object of the invention to safeguard the integrity of client data in an Internet-based data processing system or business.

Another object of the invention is to provide third party Internet-based data processing in which clients have access to and control over their own data.

A further object of the invention is to provide an Internet-based data processing system in which clients can obtain a copy of their data for on-site backup.

Yet another object of the invention is to provide a system of the above character in which the backup is provided in a format other than that used by the third party data processing system.

Yet a further object of the invention is to provide a system of the above character in which the data is encrypted to protect its confidentiality.

Still another object of the invention is to safeguard the third-party data processing software for use by the client in the event the third party were to go out of business.

These and other objects and advantages will become more apparent from the following detailed description considered with reference to the accompanying drawings.

DETAILED DESCRIPTION OF THE INVENTION

Figure 1:
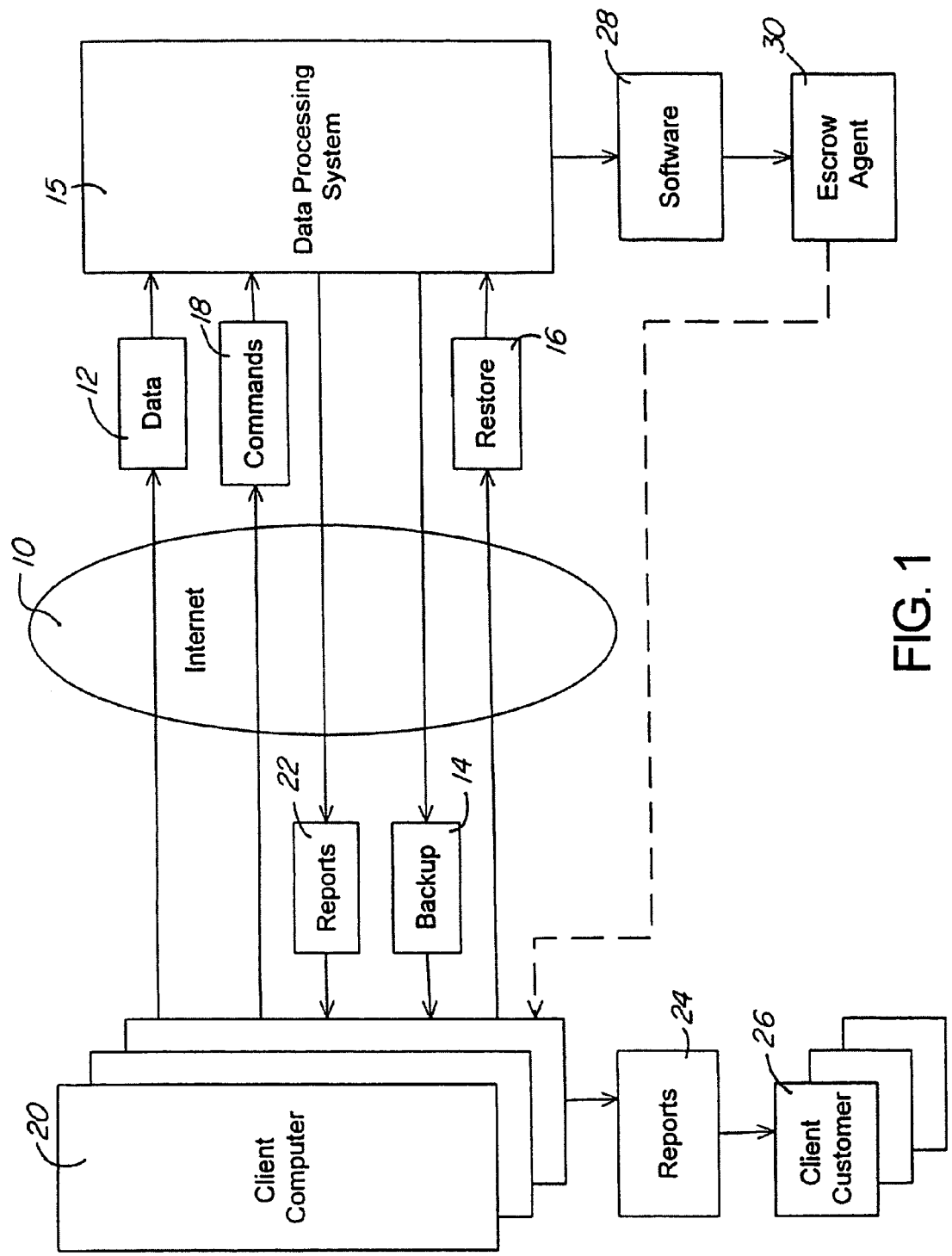
FIG. 1 is a block diagram of an Internet-based data processing system providing backup on clients' sites.

FIG. 1 is a block diagram of an Internet-based data processing system providing backup on clients' sites. The client computer 20 and data processing system 15 are connected by an Internet communications link 10. The client computer 20 executes software (FIG. 4 No. 38), residing on the data processing system 15, for storing data on the data processing system. The client computer 20 executes software, residing on the data processing system 15, for displaying, updating, and deleting data 12 stored on the central data processing system 15. The data processing system 15 transmits 14 a copy of stored data to the client computer 20. The client computer 20 issues commands 18 for transmitting (restoring) data 16 back to the data processing system 15. The client computer 20 executes software (FIG. 4 No. 38), residing on the data processing system 15, requesting reports from the data processing system 15. The data processing system 15 transmits reports 22 to the client computer 20. The client computer can generate reports 24 and transmit said generated reports to a client customer 26.

Figure 2:
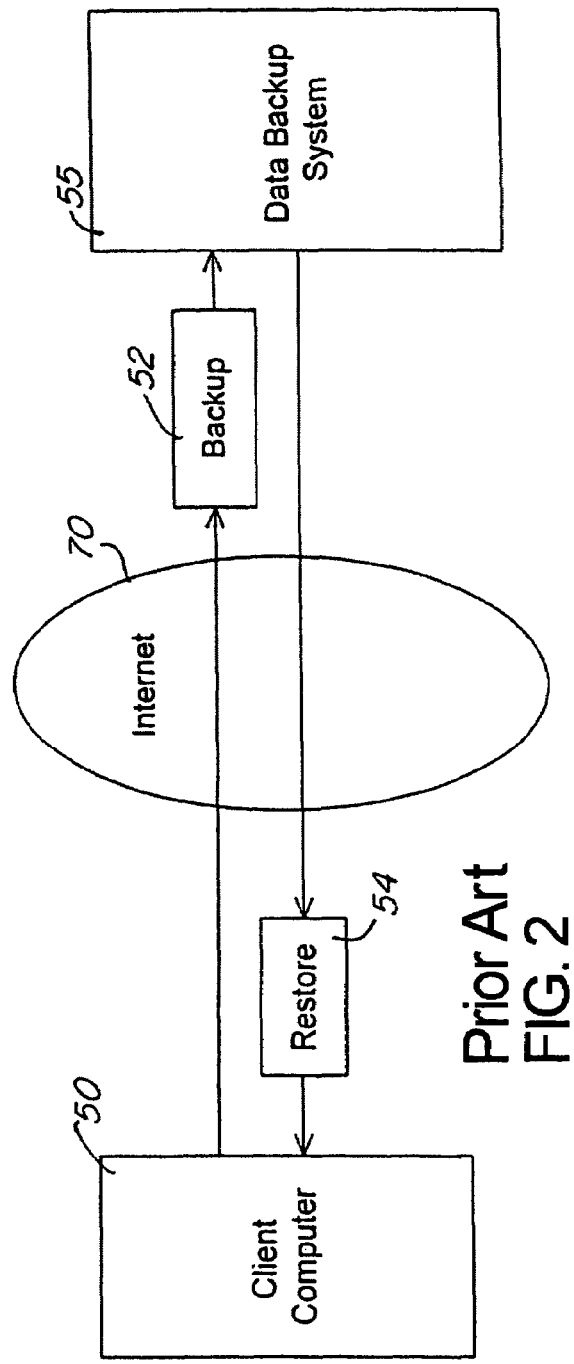
FIG. 2 is a block diagram of prior art systems providing Internet backup for data processing on clients' sites.

FIG. 2 is a block diagram of prior art systems providing Internet backup for data processing on clients' sites. The client computer 50 and data backup system 55 are connected by an Internet communications link 70. Data displayed, manipulated, and deleted (not shown) by the client computer 50 is stored on the client computer 50. The client computer 50 executes software for transmitting a copy of data 52 to the data backup system 55. The client computer executes software for retrieving data 54 stored on the data backup system 55. There is no onsite backup of data for the client computer 50 to retrieve.

Figure 3:
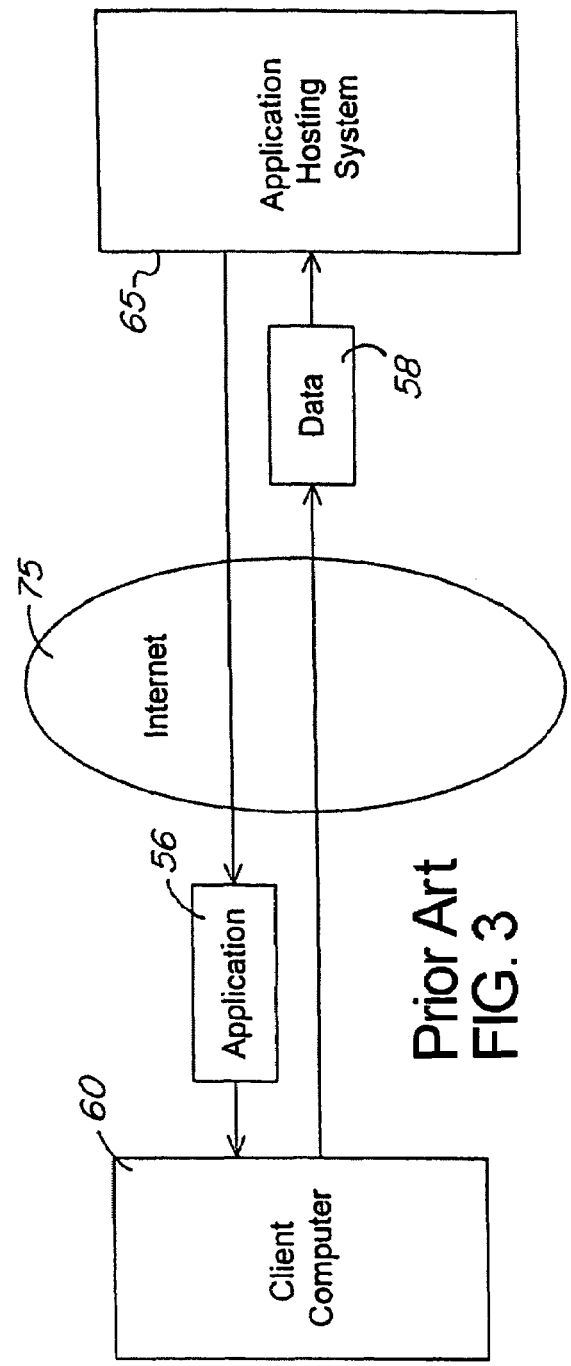
FIG. 3 is a block diagram of prior art systems providing Internet hosting of application and storage of data.

FIG. 3 is a block diagram of prior art systems providing Internet hosting of application and storage of data. The client computer 60 and application hosting system 65 are connected by an Internet communications link 75. Data displayed, manipulated, and deleted (not shown) by the client computer 60 is stored on the application hosting system 65. There is no onsite backup of data for the client computer 60 to access.

Figure 4:
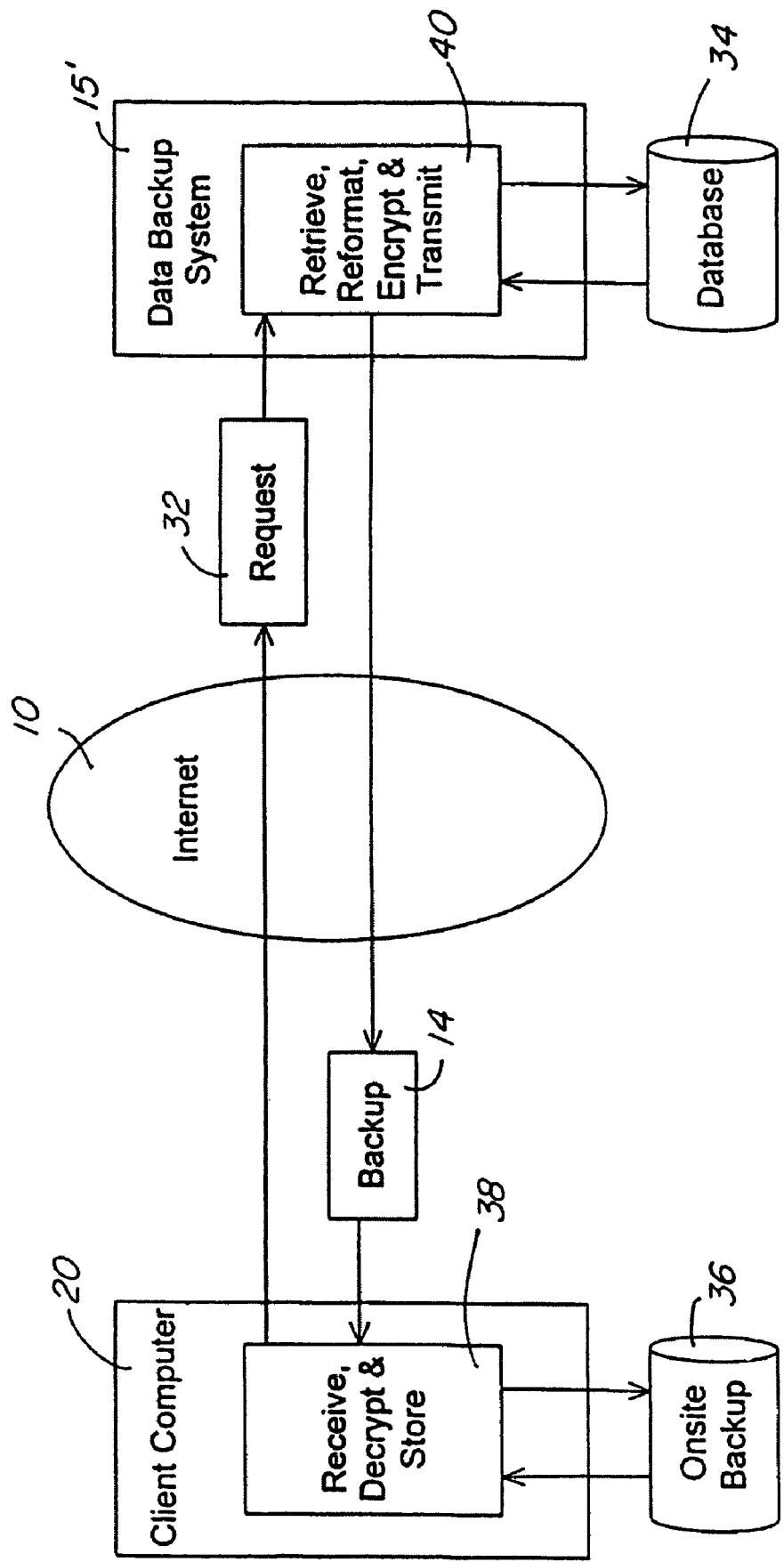
FIG. 4 is a block diagram of the system of FIG. 1 illustrating additional format conversion and encryption features.

FIG. 4 is a block diagram of the system of FIG. 1 illustrating additional format conversion and encryption features. This additional feature allows a client to back-up data on-site that is securely stored in a plurality of formats the client may require. The client computer 20 transmits a request 32 to the data backup system 15'. The data backup system 15' accesses data (stored on the data backup system 34), reformats the data, encrypts the data, and transmits the data 40, 14 to the client computer 20. The client computer 20 receives, decrypts, and stores 38 the data onsite 36.

It is to be understood that although specific embodiments of the invention have been described herein in detail, such description is for purposes of illustration only and modifications may be made thereto by those skilled in the art within the scope of the invention.

What is claimed is:

1. A system for onsite backup of internet-based data comprising:
   a central computer;
   a client computer at a client site;
   a communications link between said central computer and the Internet;
   a communications link between said client computer and the Internet;
   at least one database containing a plurality of data records accessible by said central computer, each data record containing a client identification number;
   software executing on said central computer for receiving a data backup request from said client computer for at least one of the data records;
   software executing on said central computer for transmitting said data backup to the client site for storage in an onsite location accessible by said client computer, wherein said central computer converts the at least one data record to a format corresponding to a data conversion request, wherein the conversion of the at least one data record to a format corresponding to said data format conversion request occurs prior to the at least one data record being sent from said central computer to the client site; and
   wherein the onsite location is accessible by said client computer without using said communications link between said client computer and the Internet.

2. The system of claim 1 further comprising of software executing on said central computer for retrieving said data backup.

3. The system according to claim 1, further comprising:
   a local area network (LAN) at the client site, wherein the onsite location is accessible by said client computer via said LAN.

4. A system for onsite backup of internet-based data comprising:
   a central computer;
   a client computer at a client site;
   a communications link between said central computer and the Internet;
   a communications link between said client computer and the Internet;
   at least one database containing a plurality of data records accessible by said central computer, each data record containing a client identification number;
   software executing on said central computer for receiving commands from said client computer;
   software executing on said central computer for receiving data from said client computer;
   software executing on said central computer for storing said received data in said database;
   software executing on said central computer for generating a data backup request for at least one of the data records;
   software executing on said central computer for transmitting said data backup request through the internet;
   software executing on said central computer for receiving a reply to said data backup request;
   software executing on said central computer for transmitting said data backup to the client site for storage in an onsite location accessible by said client computer, wherein said central computer converts the at least one data record to a format corresponding to a data conversion request, wherein the conversion of the at least one data record to a format corresponding to said data format conversion request occurs prior to the at least one data record being sent from said central computer to the client site; and
   wherein the onsite location is accessible by said client computer without using said communications link between said client computer and the Internet.

5. The system of claim 4 further comprising of software executing on said central computer for retrieving said data backup.

6. The system according to claim 4, further comprising:
   a local area network (LAN) at the client site, wherein the onsite location is accessible by said client computer via said LAN.

7. A system for onsite backup of internet-based data comprising:
   a central computer;
   a client computer at a client site;
   a communications link between said central computer and the Internet;
   a communications link between said client computer and the Internet;
   at least one database containing a plurality of data records accessible by said central computer, each data record containing a client identification number;
   software executing on said central computer for receiving commands from said client computer, for receiving data from said client computer, and for storing said data in said database;
   software executing on said central computer for receiving a data backup request and for receiving a data format conversion request;
   software executing on said central computer for retrieving said data from said database and for converting said data to a format corresponding to said data format conversion request, wherein the conversion of said client data to a format corresponding to said data format conversion request occurs prior to said client data being sent from said central computer to the client site;
   software executing on said central computer for encrypting said data backup;

software executing on said central computer for transmitting said data backup to the client site for storage in an onsite location accessible by said client computer; and software executing on said client computer for decrypting said data backup; and wherein the onsite location is accessible by said client computer without using said communications link between said client computer and the Internet.

8. The system of claim 7 further comprising of software executing on said central computer for retrieving said data backup.

9. The system according to claim 7, further comprising:
a local area network (LAN) at the client site, wherein the onsite location is accessible by said client computer via said LAN.

10. A system for local storage of data through the Internet comprising:
a central computer connected to the Internet;
a client computer at a client site connected to the Internet;
at least one storage having a plurality of client data records, said at least one storage accessible by said central computer, each client data record having an identifier that relates the client data record to a client;
a client data request, sent from said client computer via the Internet to said central computer; and
client data corresponding to said client data request, sent from said central computer via the Internet to the client site and saved in an onsite location accessible by said client computer, wherein said central computer converts said client data to a format corresponding to a data conversion request, wherein the conversion of said client data to a format corresponding to said data format conversion request occurs prior to said client data being sent from said central computer to the client site; and
wherein the onsite location is accessible by said client computer without using a communications link between said client computer and the Internet.

11. The system according to claim 10 wherein said client data is encrypted prior to being sent to the client site to be saved in the onsite location.

12. The system according to claim 10 further comprising a data format conversion request, sent from the client computer to said central computer.

13. The system according to claim 12 wherein said client data is encrypted prior to being sent to the client site to be saved in the onsite location.

14. The system according to claim 10, further comprising:
a local area network (LAN) at the client site, wherein the onsite location is accessible by said client computer via said LAN.

* * * * *